United States Patent
Lee et al.

(10) Patent No.: US 6,459,479 B1
(45) Date of Patent: Oct. 1, 2002

(54) OPTICAL DETECTION OF A FIBER SPAN WITH HIGH POLARIZATION-MODE DISPERSION IN A FIBER SYSTEM

(75) Inventors: Sanggeon Lee, Union City; Alan E. Willner, Los Angeles, both of CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/728,944

(22) Filed: Dec. 1, 2000

Related U.S. Application Data

(60) Provisional application No. 60/168,848, filed on Dec. 2, 1999.

(51) Int. Cl.⁷ ............................................. G01N 21/00
(52) U.S. Cl. ................................................... 356/73.1
(58) Field of Search .............................. 356/73.1, 223, 356/345, 350; 385/39, 42, 122, 47

(56) References Cited

U.S. PATENT DOCUMENTS

| | | | |
|---|---|---|---|
| 4,738,503 A | * 4/1988 | Desurvire et al. | ....... 350/96.15 |
| 4,997,277 A | 3/1991 | Horiguchi et al. | |
| 5,767,956 A | 6/1998 | Yoshida | |
| 5,917,179 A | 6/1999 | Yao | |
| 6,052,393 A | 4/2000 | Islam | |
| 6,178,036 B1 | 1/2001 | Yao | |

* cited by examiner

Primary Examiner—Frank G. Font
Assistant Examiner—Tu T. Nguyen
(74) Attorney, Agent, or Firm—Fish & Richardson P.C.

(57) ABSTRACT

Techniques for monitoring polarization-mode dispersion in a fiber span and location such fiber span in a fiber system based on the stimulated Brillouin scattering process.

27 Claims, 4 Drawing Sheets

OPTICAL DETECTION OF A FIBER SPAN WITH HIGH POLARIZATION-MODE DISPERSION IN A FIBER SYSTEM

This application claims the benefit of U.S. Provisional Application No. 60/168,848, filed Dec. 2, 1999 and entitled ALL-OPTICAL REMOTE LOCATION OF HIGH POLARIZATION MODE DISPERSION FIBER SPANS USING STIMULATED BRILLOUIN SCATTERING.

TECHNICAL FIELD

This application relates to optical dispersion, and more specifically, to techniques and systems for detecting and locating a fiber span with high polarization-mode dispersion in an optical fiber system.

BACKGROUND

Some optical transmission media such as optic fibers may be "birefringent", i.e., they have different refractive indices for light of different polarizations. Typical causes for such birefringence in certain fibers include, among others, imperfect circular core and unbalanced stress in a fiber along different transverse directions perpendicular to the fiber core. Such optic fibers are said to exhibit polarization-mode dispersion ("PMD") because the different polarizations travel at different speeds. An optical pulse with optical components of different polarizations, therefore, may be broadened after propagation through such fibers.

This dispersion effect may be undesirable because the pulse broadening can limit the transmission bit rate, the transmission bandwidth, and other performance factors of an optical communication system. In fact, PMD is one of key limitations to the performance of some high-speed optical fiber communication systems at or above 10 Gbits/s due to the fiber birefringence. Fibers with significant PMD (e.g., about 1 to 100 ps/km) are used in various fiber networks, particularly in those that were deployed in 1980's and early 1990's. Hence, the compensation of PMD is desirable for high-speed transmission that uses those PMD systems.

The properties of PMD in a fiber system, however, need be measured and characterized in order to provide adequate compensation. A given fiber network or system, for example, may include fiber spans of varying degrees of PMD and only some fiber spans with high PMD contribute significantly to the total PMD. Hence, it may be desirable to identify and locate such a fiber span of high PMD in order to measure the properties of the PMD in that fiber span.

SUMMARY

One device in this application includes a pump laser, an optical modulator, a photodetector, and a signal processor. The pump laser is operable to produce a pump beam with a power above a threshold value for a Stimulated Brillouin Scattering (SBS) process in a fiber span. The optical modulator is adapted to modulate the pump beam to produce a pulsed pump train in which each pulse has a pulse duration approximately equal to or longer than a time for the pump beam to travel a round trip in the fiber span. The photodetector is positioned to receive a SBS signal reflected from the fiber span to produce a detector output signal. The signal processor processes the detector output signal to determine a location of a fiber segment with a high PMD value in the fiber span.

DETAILED DESCRIPTION

The techniques of this disclosure include measuring a signal of a stimulated Brillouin scattering (SBS) process in a target fiber network or system to detect a fiber span that exhibits high PMD. The stimulated Brillouin scattering is a nonlinear optical phenomenon in a Brillouin medium with an electrorestrictive effect. Under illumination of a pump beam, an acoustic grating moving in the direction of the pump beam can be generated in this medium to interact with the pump beam. This interaction and an associated phase-matching condition produce a Brillouin signal wave at a frequency less than that of the pump beam and in a direction opposite to that of the pump beam. When the input power exceeds a threshold, a stimulated Brillouin scattering effect occurs where a significant portion of the input power is transferred into the back-scattered Brillouin signal wave to amplify the initial Brillouin signal wave.

Since the SBS signal wave is generated from the electrorestrictive effect in the fiber span as the Brillouin medium, it has a dependence on the stress or strain in the fiber span. For example, the SBS gain in the fiber span changes with the stress. The SBS signal wave also has a dependence on any parameter that affects the stress or strain of the fiber span, such as the temperature, the thermal and mechanical properties of the surroundings of a fiber span. It is further recognized that, a change in the stress in the fiber span may also cause a change in the PMD of the fiber span. Thus, a change in the SBS signal wave, e.g., the SBS gain, and a change in the PMD of the fiber span can have a correlation with respect to each other. This correlation between the SBS signal wave and the PMD, therefore, can be used to monitor a change in the PMD of a selected fiber span by monitoring the SBS signal from the same fiber span.

Figure 1:
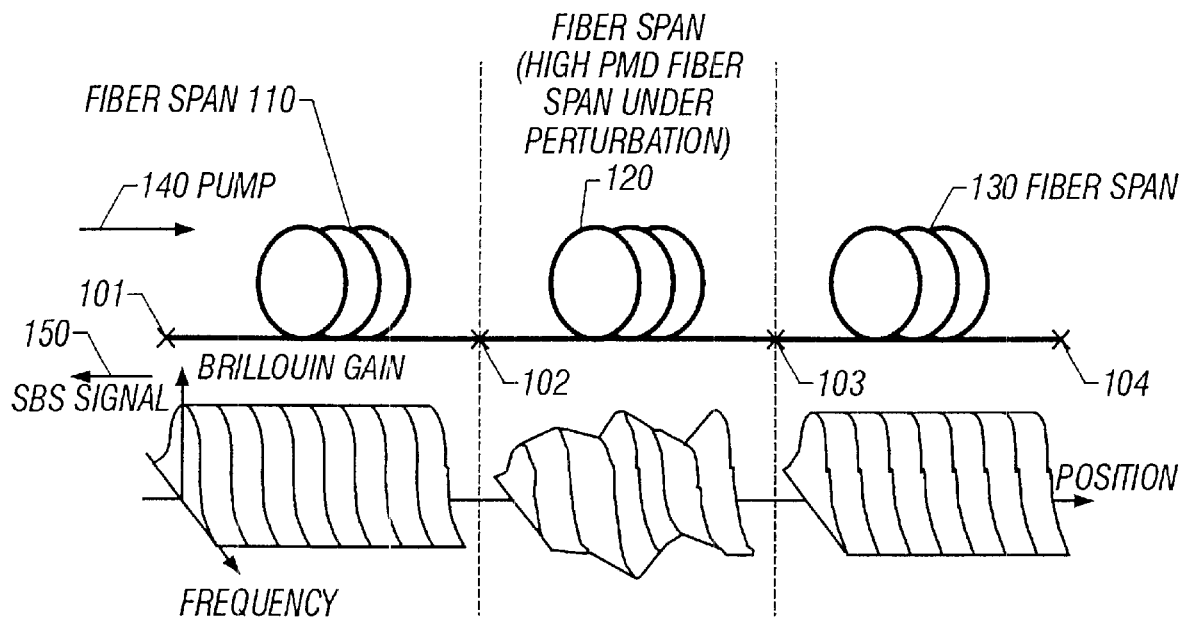
FIG. 1 illustrates detection of a fiber span with high PMD in a fiber system based on a stimulated Brillouin scattering process according to one embodiment.

FIG. 1 illustrates the operation of the above detection technique in a fiber transmission line formed of three different fiber spans 110, 120, and 130. It is assumed that, the fiber spans 110 and 130 have low PMD values and have nearly uniform SBS gain at different positions along the fiber if the fiber loss were negligible. The fiber span 120, however, is assumed to have a high PMD value caused by the localized external perturbation such as a change in the stress. The strength of the Brillouin acoustic grating in the fiber span 120 thus has a spatial distribution along the fiber according to the stress or strain distribution. Consequently, the SBS gain spectrum is no longer uniform along the fiber but has a spatial variation pattern corresponding to the stress or strain distribution. Hence, the spatial profile of the SBS gain along the fiber can be used to locate a fiber span with a high PMD value caused by the localized external perturbation.

As illustrated in FIG. 1, a pump laser beam 140 at a selected pump wavelength may be injected into the fiber line at a fiber terminal 101 to produce a reflected, SBS signal 150. The intensity of the pump beam 140 is above the SBS threshold for the fiber. Since the SBS is a coherent nonlinear process, the SBS threshold can be relatively low to obtain significant SBS amplification of the back-scattered Brillouin signal. For example, the SBS threshold is known to be linearly proportional to the spectral linewidth of the optical pump wave. Therefore, a narrow pump linewidth may be used to reduce the SBS threshold. In many commercial silica fibers, a SBS threshold of several milliwatts may be achieved by using a pump wave at about 1.55 μm and 1.3 μm. The pump wavelength in general may be at any wavelength so that the SBS threshold and the fiber loss are acceptable. In some applications, the pump wavelength may be different from a signal wavelength carried by the fiber.

The pump beam 140 may be modulated to have square pulses in the time domain. The pulse duration or width, during which is the pump beam 140 is on, may be approximately equal to or greater than a round-trip time for the pump beam 140 to travel between the point of injection, 101, to another location in the fiber line, such as 102, 103, or 104. Hence, the pulse duration may be slightly greater than the round-trip time between the locations 101 and 104 when the spatial SBS gain profile of the entire fiber between 101 and 104 is to be measured. The pulse duration may be selected at a smaller value to measure the SBS gain profile between 101 and 103. The above condition is to ensure that, during each pulse, the pump power is above the SBS threshold everywhere in the fiber span under measurement to maintain the SBS amplification throughout the fiber span. One consequence of this condition is further reduction of the input pump power since the back-scattered Brillouin signal is continuously amplified.

The SBS signal 150 received during each pulse at the injection point 101 is a signal that varies with time. Different times within a pulse correspond to different locations in the fiber span under measurement. This time response can be converted into a spatial profile as illustrated in FIG. 1. The spatial SBS gain profile is then used to determine the PMD distribution in the fiber. In measuring actual fiber systems, the above measurement may be performed for a fiber span between two nodes. Once a particular fiber span is determined to have a high PMD value, a PMD compensation device may be strategically deployed at or near the locale of that fiber span to reduce the PMD. This can reduce the number of PMD compensators in a fiber system. Alternatively, a particular fiber span with high PMD in a fiber system, after being so identified, may be selectively replaced with a fiber span with low PMD. Hence, the cost for updating a fiber system may be reduced since there is no need to replace an entire fiber link that includes the high PMD fiber span.

Figure 2:
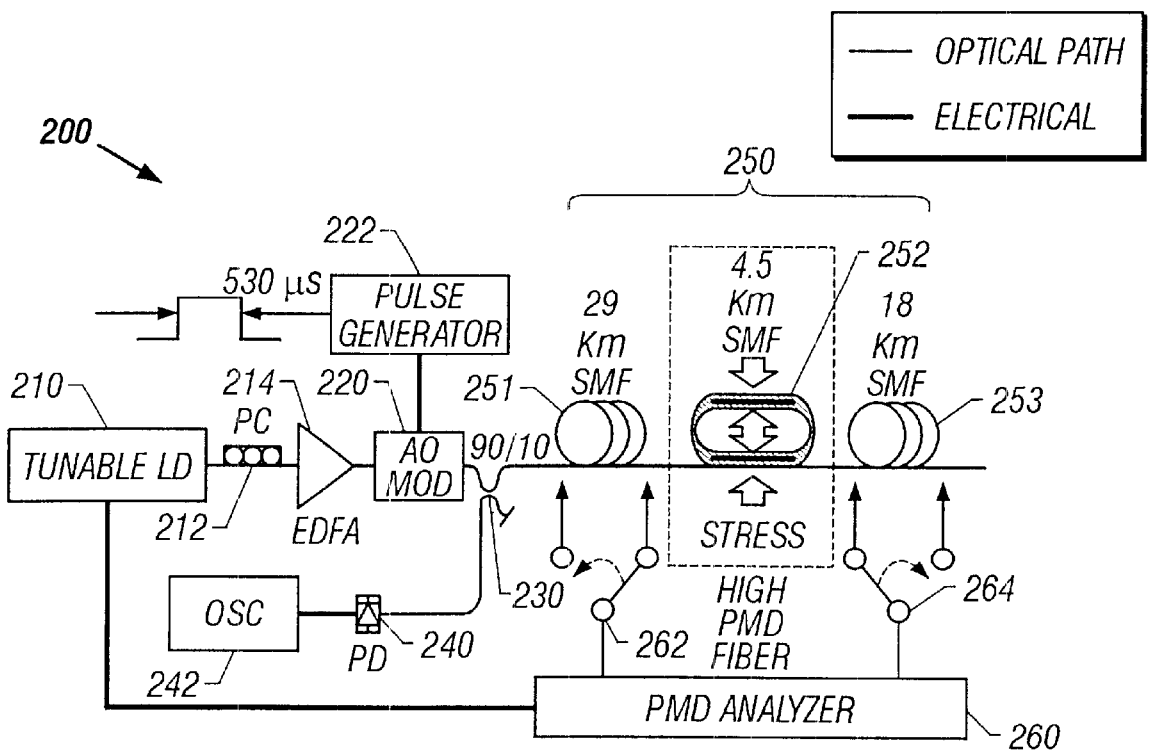
FIG. 2 shows one exemplary detection system based on the mechanism shown in FIG. 1.

FIG. 2 shows one embodiment of a PMD monitor system 200 for monitoring a fiber line 250. A tunable laser 210, e.g., a diode laser, may be used as the pump source to generate a SBS pump beam. An optical modulator 220, e.g., an acousto-optic modulator, may be used to modulate the pump beam to produce a pump pulse train with a desired pulse duration. A pulse generator 220 is coupled to the modulator 220 to control the pulse width. A polarization controller 212 and an Er-doped fiber optical amplifier 214 may be placed before the modulator 220 to modify and control the pump beam. An optical fiber coupler 230 is used to couple at least a portion of the SBS signal out of the fiber line 250. A photodetector 240 is used to receive and convert the SBS signal into an electronic signal for processing by a signal processor 242. The signal processor may include an oscilloscope to display the pulse of the SBS signal.

The operation of the above system 200 is tested by using three single-mode fiber spans 251 of 29 km, 252 of 4.5 km, and 253 of 18 km connected in series as the fiber line 250. The fiber span 252 is coupled to a mechanical device that controls the fiber stress. The pulse width of the pump is about 530 μs, slightly longer than the round trip delay of the fiber line 250 of 51.5 km. A PMD analyzer 260 is coupled to the fiber line 250 to measure the actual PMD in any single fiber span or any combinations of the fiber spans in the fiber line 250. Two optical switches 262 and 264 are used to select a portion of the fiber in the fiber line 250 to be measured. Hence, the actual PMD values and the SBS gain values can be compared to confirm the correlation between the SBS gain and the PMD. An a diode laser with an external cavity, or a distributed feedback diode laser, tunable from about 1500 nm to about 1580 nm, may be used as the pump source 210.

Figure 3:
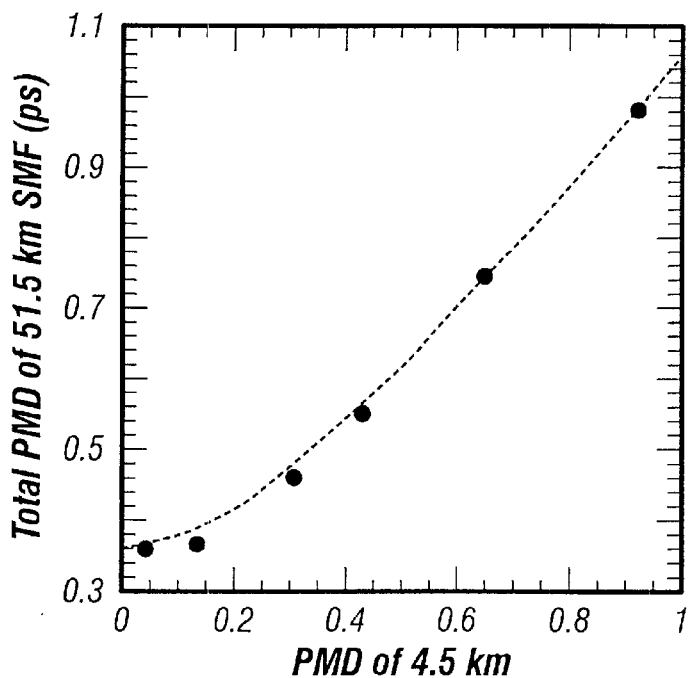
FIGS. 3, 4A, and 4B show measured results from one implementation of the system in FIG. 2.

The total PMD of the fiber line 250 is measured at about 0.36 ps when no external stress is applied to the fiber span 252. This amount of PMD is primarily contributed by the fiber spans 251 and 253. When the fiber span 252 is stretched, additional PMD is introduced in the fiber span 252 and can become the primary source for the overall PMD in the fiber line 250 if the stress is sufficiently large. FIG. 3 shows measured PMD values in the entire fiber line 250 as a function of the PMD values in the fiber span 252 under different stress values. The dotted curve represents the expected overall PMD values calculated from the square root of the sum of the squared PMD values of the three fiber spans.

Figure 4A:
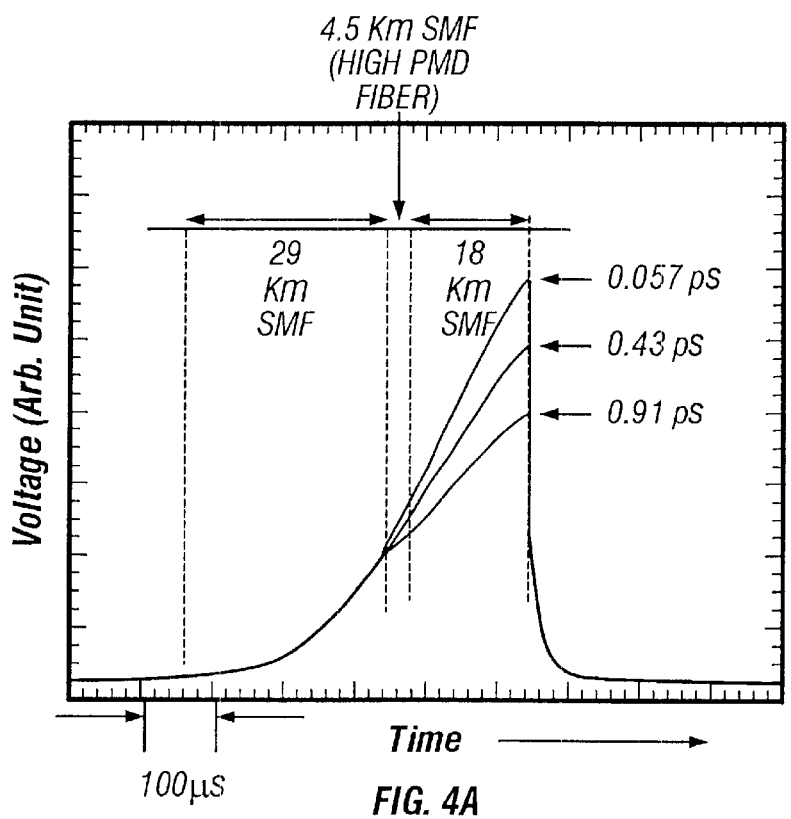

FIG. 4A shows the measured temporal response of each SBS pulse from the entire fiber span 250 of 51.5 km. The pump beam is at a wavelength of about 1549.59 nm and has a power of about 7.59 dBm. The input pump power is adjusted so as not to saturate the SBS through the whole 51.5-km fiber span 250 and to provide a gradual increment in SBS pulse power over time. Each curve represents a trace on the oscilloscope after being averaged by 64 times. The SBS power increases as more of the pump pulse enters the fiber 250 and then decreases abruptly at end each pulse. Three different measurements are shown for three different PMD values of 0.057 ps, 0.43 ps, and 0.91 ps, respectively, in the 4.5-km fiber span 252 under different external stress values.

Figure 4B:
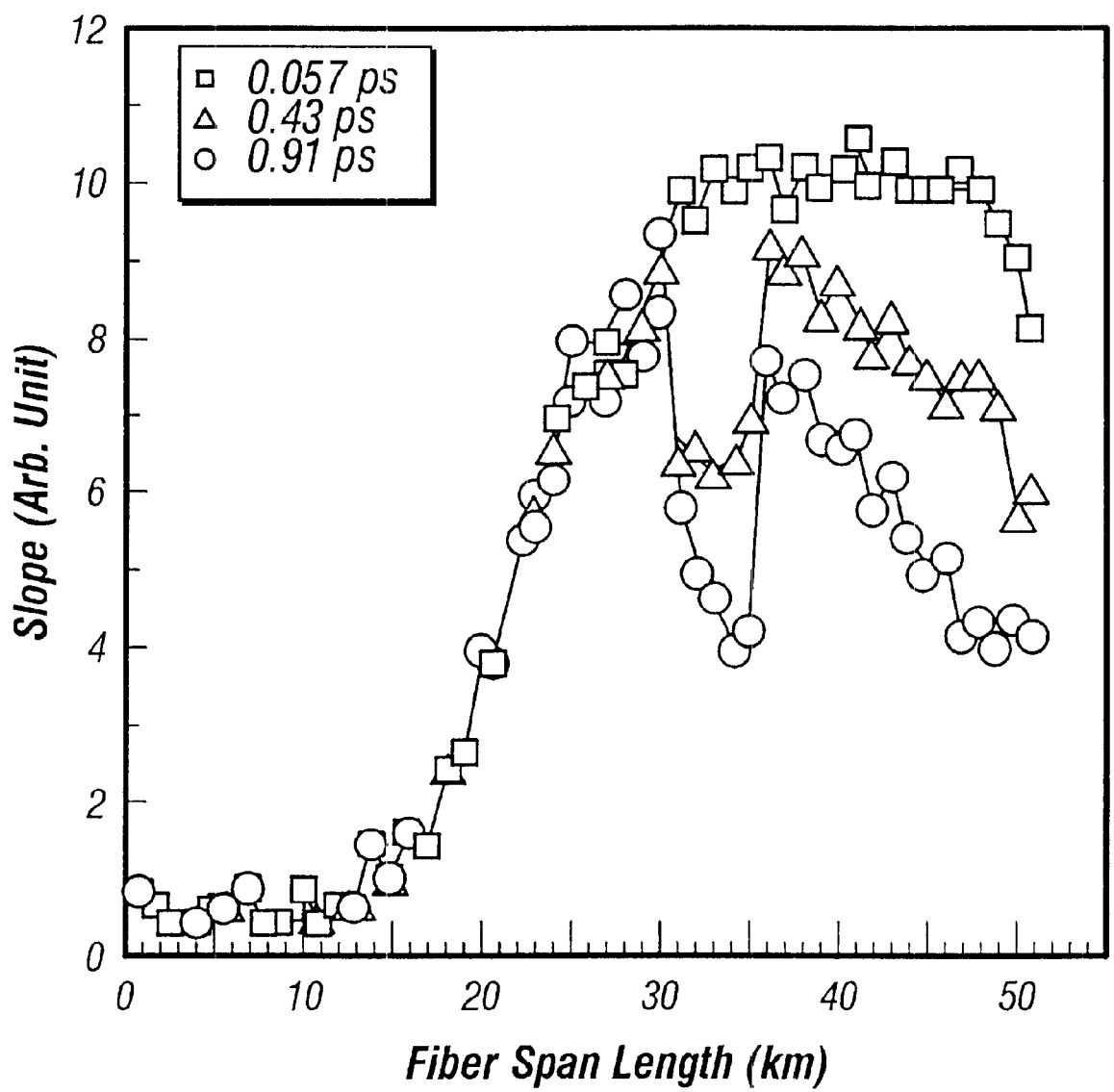

The slope of the rising edge of pulse changes with PMD values in the fiber span 252. FIG. 4B shows the slope values in a time interval of 10 μs obtained from the curves in FIG. 4A. A time interval of 10 μs corresponds to about 1 km of fiber. Hence, under high stress values in the fiber span 252, the slope changes significantly (reduced) in the stressed fiber span 252 to form a dip. The depth of the dip approximately represents the PMD caused by the stress and location of the dip marks the location in the fiber where the stress-induced PMD occurs. A special designed circuit or a microprocessor may be included in the signal processor 242 to perform the derivative computation to produce the slope data in FIG. 4B.

Figure 5A:
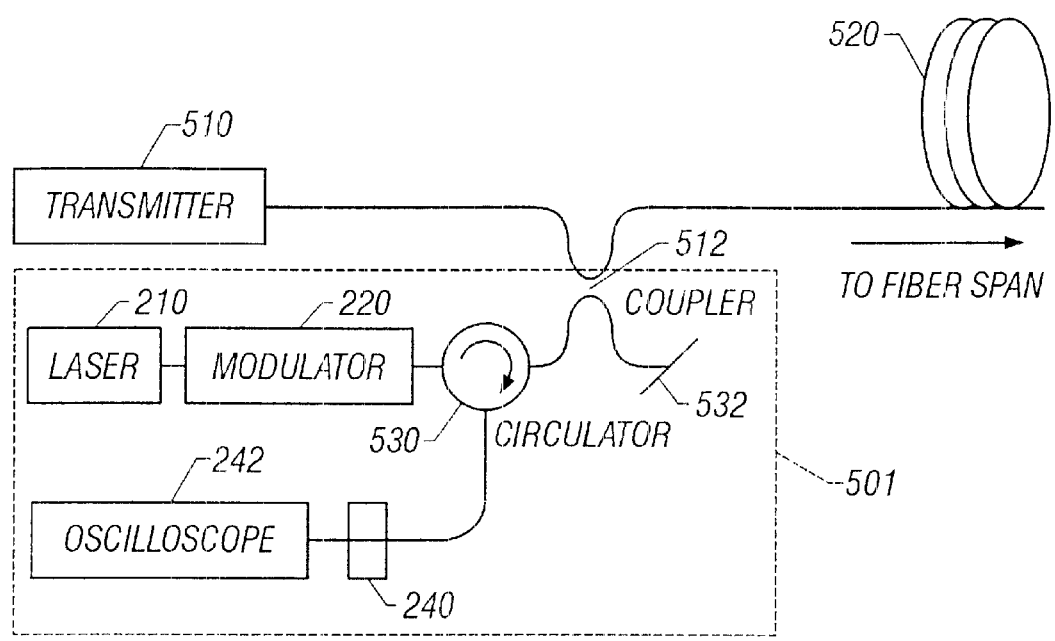
FIGS. 5A and 5B further show different embodiments of the detection system based on the above SBS detection mechanism.
Figure 5B:
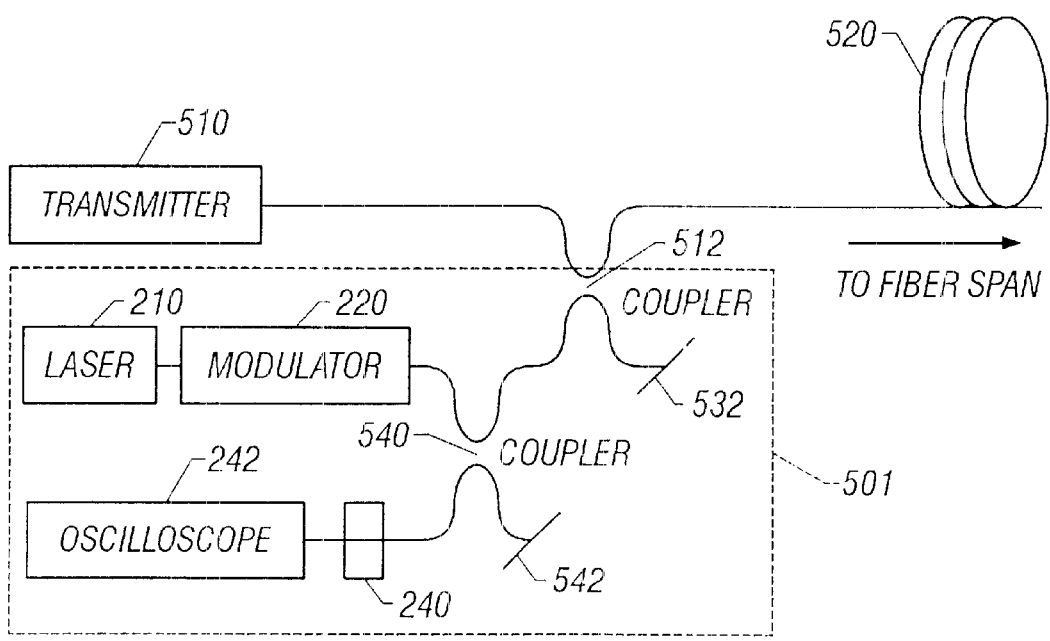

FIGS. 5A and 5B further show different embodiments of the detection system based on the above SBS detection mechanism. A laser transmitter 510 is used to send one or more optical signal channels into the fiber transmission system 520 which may be a fiber line or a network of fiber lines. An optical fiber coupler 512 is placed in the fiber system 520 to optically couple the SBS detection system 501 based on the system shown in FIG. 2. The coupler 512 couples both a SBS pump beam from the laser 210 into the fiber system 520 and a back-scattered SBS signal produced in the fiber system 520 into the SBS detection system 501. Either an optical circulator 530 or a fiber coupler 540 may be used to couple the SBS signal into the photodetector 240. Fiber terminators 532 and 542 may be used to reduce the optical reflections in the detection system 501. The pump wavelength of the pump laser 210 and the signal wavelength (s) from the laser transmitter 510 may be different.

Hence, the above SBS technique provides a method for measuring PMD values in a fiber span in a remote location since the location of the injecting the pump and receiving the SBS signal can be different from the location of the fiber span under measurement. First, the pump laser beam is injected into the fiber span. Second, the pump laser beam is set to have a power level higher than a threshold value for a SBS)process to occur in the fiber span. The pump laser beam is also modulated to be pulsed with a pulse duration approximately equal or greater than a time for the pump laser beam to make a round trip in the fiber span. Next, a temporal response of a pulse in a SBS signal reflected from the fiber span is measured. The slope of the temporal response of the pulse in the SBS signal as a function of time may be further obtained to determine the location of the fiber segment with a high PMD value in the fiber span.

Although the present disclose only includes a few examples, it is understood that various modifications and enhancements may be made without departing from the following claims.

What is claimed is:

1. A device, comprising:
   a pump laser operable to produce a pump beam with a power level above a threshold value for a Stimulated Brillouin Scattering (SBS) process in a fiber span to produce a SBS signal propagating in a direction opposite to said pump beam;
   an optical modulator adapted to modulate said pump beam to produce a pulsed pump train, each pulse having a pulse duration approximately equal to or longer than a time for the pump beam to travel a round trip in the fiber span;
   a photodetector to receive said SBS signal reflected from the fiber span to produce a detector output signal; and
   a signal processor to process said detector output signal to determine a location of a fiber segment with high polarization-mode dispersion in the fiber span.

2. The device as in claim 1, wherein said signal processor is configured to determine said location according to a slope of said detector output signal with respect to time.

3. The device as in claim 1, wherein said optical modulator includes an acousto-optic modulator.

4. The device as in claim 1, further comprising a polarization controller between said pump laser and said optical modulator.

5. The device as in claim 1, further comprising a fiber optical amplifier between said pump laser and said optical modulator.

6. The device as in claim 1, wherein said power level of said pump beam is maintained at a level not to saturate the SBS process in the fiber span.

7. The device as in claim 1, further comprising an optical coupler to couple at least a portion of said SBS signal out of said fiber span into said photodetector.

8. The device as in claim 7, wherein said optical coupler is used to further couple said pump beam from said pump laser into the fiber span.

9. The device as in claim 1, wherein said signal processor is configured to convert a temporal response of said SBS signal into a spatial profile of said SBS signal as a function of location in the fiber span.

10. The device as in claim 1, wherein said pump laser includes a tunable laser.

11. The device as in claim 10, wherein said pump laser includes a distributed feedback diode laser.

12. The device as in claim 1, wherein said signal processor includes a microprocessor.

13. A method, comprising:
    injecting a pump laser beam into a fiber span;
    setting the pump laser beam to have a power level higher than a threshold value for a Stimulated Brillouin Scattering (SBS) process to occur in the fiber span;
    modulating the pump laser beam to be pulsed with a pulse duration approximately equal or greater than a time for the pump laser beam to make a round trip in the fiber span;
    measuring a temporal response of a pulse in a SBS signal reflected from the fiber span;
    converting the temporal response into a spatial profile of the SBS signal as a function of location in the fiber span; and
    using the spatial profile of the SBS signal to determine a location of a fiber segment within the fiber span that has a high polarization mode dispersion.

14. The method as in claim 13, further comprising obtaining a slope of the temporal response of the pulse in the SBS signal as a function of time.

15. The method as in claim 14, further comprising using a dip in the slope to determine a location of a fiber segment with high polarization-mode dispersion in the fiber span.

16. The method as in claim 13, wherein the pump laser beam has a pump wavelength different from a wavelength of a signal beam carried in the fiber span.

17. The method as in claim 13, further comprising injecting the pump laser beam and receiving the SBS signal at a location in the fiber span that is different from a location of a fiber segment in the fiber span whose polarization mode dispersion is detected to allow for remote detection of the distribution of polarization mode dispersion the fiber span.

18. The method as in claim 13, further comprising controlling the power level of the pump laser beam so as not to saturate the SBS process in the fiber span.

19. A method, comprising:
    injecting a pump laser beam into a fiber span with a power level higher than a threshold value to generate a back-scattered signal from a stimulated Brillouin scattering (SBS) process in the fiber span;
    maintaining presence of the pump power in locations within the fiber span where the back-scattered signal is present to amplify the back-scattered signal; and
    measuring a response of the back-scattered signal to determine a location of a fiber segment of high polarization-mode dispersion in the fiber span.

20. The method as in claim 19, wherein the pump laser beam is pulsed to have a pulse duration approximately equal or greater than a time for the pump laser beam to make a round trip in the fiber span.

21. The method as in claim 20, further comprising using the response of the back-scattered signal to determine a location in the fiber span for deploying a device that compensates for the polarization-mode dispersion in an optical signal passing through said fiber segment.

22. The method as in claim 20, further comprising using information of the location of the fiber segment to replace the fiber segment with another fiber segment with low polarization-mode dispersion.

23. The method as in claim 19, further comprising obtaining a slope of the temporal response of the pulse in the SBS signal as a function of time.

24. The method as in claim 23, further comprising using a dip in the slope to determine a location of the fiber segment with high polarization-mode dispersion in the fiber span.

25. The method as in claim 19, further comprising injecting the pump laser beam and receiving the SBS signal at a location in the fiber span that is different from a location of the fiber segment in the fiber span whose polarization mode dispersion is detected to allow for remote detection of the distribution of polarization mode dispersion in the fiber span.

26. The method as in claim 19, further comprising:

converting a temporal response of the SBS signal into a spatial profile of the SBS signal as a function of location in the fiber span; and using the spatial profile of the SBS signal to determine the location of the fiber segment with the high polarization mode dispersion.

27. The method as in claim 19, further comprising controlling the power level of the pump laser beam so as not to saturate the SBS process in the fiber span.

* * * * *

UNITED STATES PATENT AND TRADEMARK OFFICE
CERTIFICATE OF CORRECTION

PATENT NO. : 6,459,479 B1
DATED : October 1, 2002
INVENTOR(S) : Sanggeon Lee and Alan E. Willner It is certified that error appears in the above-identified patent and that said Letters Patent is hereby corrected as shown below:

Column 1,
Before line 10, please insert the following paragraph:
-- STATEMENT AS TO FEDERALLY-SPONSORED RESEARCH
This invention was made with government support under Contract No. F30602-98-1-0196 awarded by the Air Force. The government has certain rights in the invention. --

Signed and Sealed this

Fourteenth Day of June, 2005

JON W. DUDAS
*Director of the United States Patent and Trademark Office*